Dec. 2, 1969   J. GERSCH ET AL   3,481,552
FILM CARTRIDGE AND SPOOL AND METHOD OF ATTACHING
FILM TO THE SPOOL
Filed April 9, 1968

INVENTORS:
JOSEF GERSCH, MAX WIESNER, FRANZ HOFFACKER, HANS-JOACHIM BARKE,
HEINZ JOHANNS, FRITZ KRECKELER.
BY
Connolly and Hutz
their attorneys

United States Patent Office

3,481,552
Patented Dec. 2, 1969

3,481,552
FILM CARTRIDGE AND SPOOL AND METHOD OF ATTACHING FILM TO THE SPOOL
Josef Gersch, Unterhaching, Max Wiesner, Leverkusen, Franz Hoffacker, Langenfeld, and Hans-Joachim Barke and Heinz Johanns, Leverkusen, and Fritz Kreckeler, Cologne-Flittard, Germany, assignors to Agfa-Gevaert Aktiengesellschaft, Leverkusen, Germany a corporation of Germany
Filed Apr. 9, 1968, Ser. No. 719,897
Claims priority, application Germany, Apr. 13, 1967,
A 55,438
Int. Cl. G03b 1/04
U.S. Cl. 242—71.1  9 Claims

ABSTRACT OF THE DISCLOSURE

The end of the film is inserted into cartridge to abut against one of a pair of flat recesses on the core of the spool positioned in front of it. The spool is then rotated about one-quarter turn until the film end springs into a slot within the core between the flats. The end is then pushed in to hook a hole in it on a projection within the slot, after which it is wound up. A central diverter between a pair of oppositely directed hooked projections are provided within the slot to insure engagement of the film end with one of the hooks.

---

Figure 1:
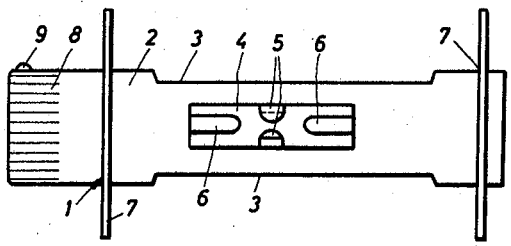

The present invention relates to a film spool with an associated film cartridge, more especially for use with miniature films, and to a method for fixing the end of the film on the spool inside the cartridge. The film cartridge is provided with a jaw for the film, and the film spool has a core comprising a slot which extends therethrough in which are arranged holding projections with securing means for fixing the perforated end of a film. The invention also provides a method of threading and fixing the film inside the cartridge, using the film spool according to the invention with its associated cartridge.

It is known that the perforated ends of films can be threaded manually or automatically into a slot in the core of the film spool, which slot is provided with holding projections, and to hook the film thereon. The film is then wound and the wound film spool is fitted into the cartridge, the free end of the film coil being left to project from the mouth of the cartridge. This manner of insertion of the loaded film spool and the closing of the cartridge are very complicated and hitherto could only be effected manually.

It has now been found that the end of the film can be fixed inside the cartridge on the spool by forming the core of the film spool with at least one flattened surface, the position of which is adapted to be controlled by a marking which can be seen on the film spool. Advantageously, the film core is provided with two flattened surfaces parallel to the slot, so that the operation of adjusting the film spool in relation to the cartridge jaw or mouth proceeds more quickly.

The method according to the invention is characterised in that the flattened portion or one of the flattened portions is adjusted at a predetermined angle to the cartridge mouth and then the film is pushed in until it strikes against the flattened surface. The film spool is then rotated until the end of the film jumps into the slot. The film is then pushed in, hooked on and finally wound.

The unprejudiced observer will object that the slot could equally well be orientated to correspond to the cartridge mouth in order immediately to introduce the end of the film through the said mouth into the slot and to hook it into position. This is indeed possible, but the variations in the tendency of the films to curl, involves too many disruptions, i.e. with too large a number of spools, the end of the film would not slip into the slot, but would slide over the core. It is only by providing the flattened portion on the spools used according to the invention, which serves as an abutment surface to the cartridge mouth, in a suitable position and at least corresponding in width to the normal variations in the degree of curling of the film, that a satisfactory threading and fixing is guaranteed, so that the entire operation can be made automatic.

A suitable angle for the position of the flattened portion relatively to the cartridge mouth can be determined empirically. It is dependent on many variables, mainly on the curling tendency of the film, which in turn is influenced, for example, by its thickness or the nature of its coating, the kind of cutting or the perforations, but also on the angle of the cartridge mouth in relation to the periphery of the cartridge, the stiffness of the cartridge lining and the spacing of the flattened portion from the cartridge mouth. These factors naturally cannot all be calculated and are subject to great fluctuations which are, however, at least partially cancelled out, whereby it is assured that the method can be carried out satisfactorily. This empirical determination is however a strictly routine measure and does not involve inventive ingenuity.

Figure 2:
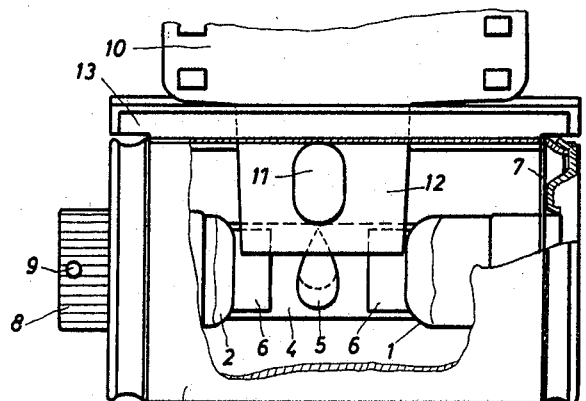
Figure 4:
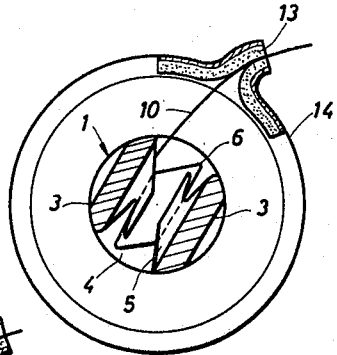
Figure 5:
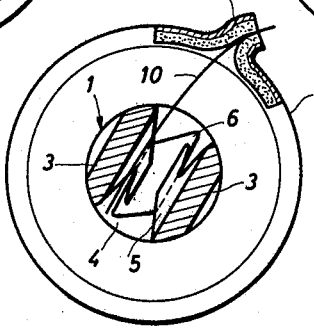

The film spool according to the invention is illustrated and the method is described by reference to the accompanying drawing, wherein:

FIGURE 1 shows the film spool in side elevation;
FIGURE 2 shows the film spool inside the cartridge with the end of the film pushed in, and
FIGURES 3 to 5 show cross-sections of the film spool and cartridge for illustrating the separate steps in the threading and fixing operations.

Referring now to FIGURE 1, the film spool 1 has a core 2 with flattened portions 3. Holding projections 5 and wedge-shaped diverting means 6 are arranged in a slot 4. The spool is provided with flanges indicated at 7, and a turning knob 8, which is provided with a marking 9 indicating the position of the flattened portions 3.

FIGURE 2 shows a film 10 with a tongue 12 having a perforation 11 pushed into the opening 13 of the cartridge 14, the film projecting into the slot 4.

Figure 3:
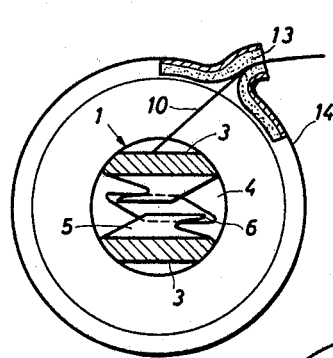

In FIGURE 3, the flattened portion 3 is in a suitable position relative to the cartridge mouth 13, so that the end of the film 10 contacts the flattened portion 3 on being introduced.

In FIGURE 4, the spool has been rotated and the end of the film has sprung into the slot 4.

FIGURE 5 shows how the film 10 is hooked in the holding projection 5.

What is claimed is:
1. A film cartridge containing a film spool, more especially for miniature film having a perforated end, the film cartridge including a mouth for insertion of the film, the film spool comprising a spool core having a longitudinal slot, the slot being provided with holding projection and securing means for attaching the perforated end of the film, the core of the film spool being provided with at least one recessed portion and index means on an external portion of the film spool for visibly indicating the orientation of said recessed portion.
2. A film cartridge as claimed in claim 1 wherein the spool core has two recessed portions disposed substantially parallel to the slot.
3. A film cartridge as set forth in claim 1 wherein a longitudinal diverting projection means extends within the ends of the slot, the holding projection and securing means comprising a pair of hook means disposed on oppo- site sides of the slot, and the diverting means being constructed and arranged to cause the perforated end of the strip to engage one of the hook means when the spool is rotated in a predetermined direction from the position in which the film end contacts the recessed portion of said core.

4. A film cartridge as set forth in claim 3 wherein the diverting means comprises a pair of axially arranged projections extending from the ends of said slot with a space inbetween them, and said pair of hook means extend in opposite directions from each other.

5. A film cartridge as set forth in claim 4 wherein said diverting means is substantially wedge-shaped in cross section and are arranged to provide a tapered throat opening toward the retreating side of the adjacent hook means whereby securing of the perforated end of the film thereon is facilitated.

6. A film cartridge as set forth in claim 1 wherein the recessed portion of the core comprises a flat portion in said core.

7. A method of threading and securing films, more especially miniature films having a perforated end, inside a cartridge having a mouth for insertion of the film and a film spool with a longitudinal slot in its core having holding projection means therewithin comprising the steps of aligning a portion of the core remote from said slot with the mouth of the cartridge, inserting the perforated end of the film through the mouth until it abuts the aligned portion of the core, rotating the film spool a portion of a turn until the end of the film springs into the slot, and pushing the film into the slot to engage the perforated end on the holding projection means whereby it is secured thereto for winding.

8. A method as set forth in claim 7 wherein the spool is rotated about a fraction of a turn to spring the abutted end of the film into the slot.

9. A method as set forth in claim 7 wherein the spool is rotated in one direction to spring the end of the film into the slot and to wind the film up on the core after its end is secured thereto.

References Cited

UNITED STATES PATENTS 2,017,160   10/1935   Parker _____ 242—71.1

NATHAN L. MINTZ, Primary Examiner